D. H. COLES.
STEERING MECHANISM FOR SELF PROPELLED VEHICLES.
APPLICATION FILED JAN. 21, 1908.
914,018.
Patented Mar. 2, 1909.
4 SHEETS—SHEET 4.
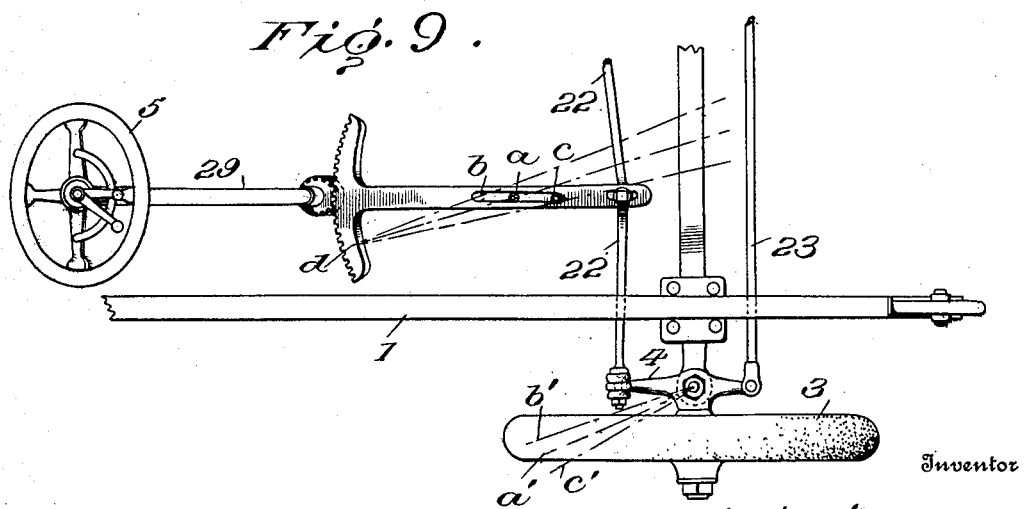

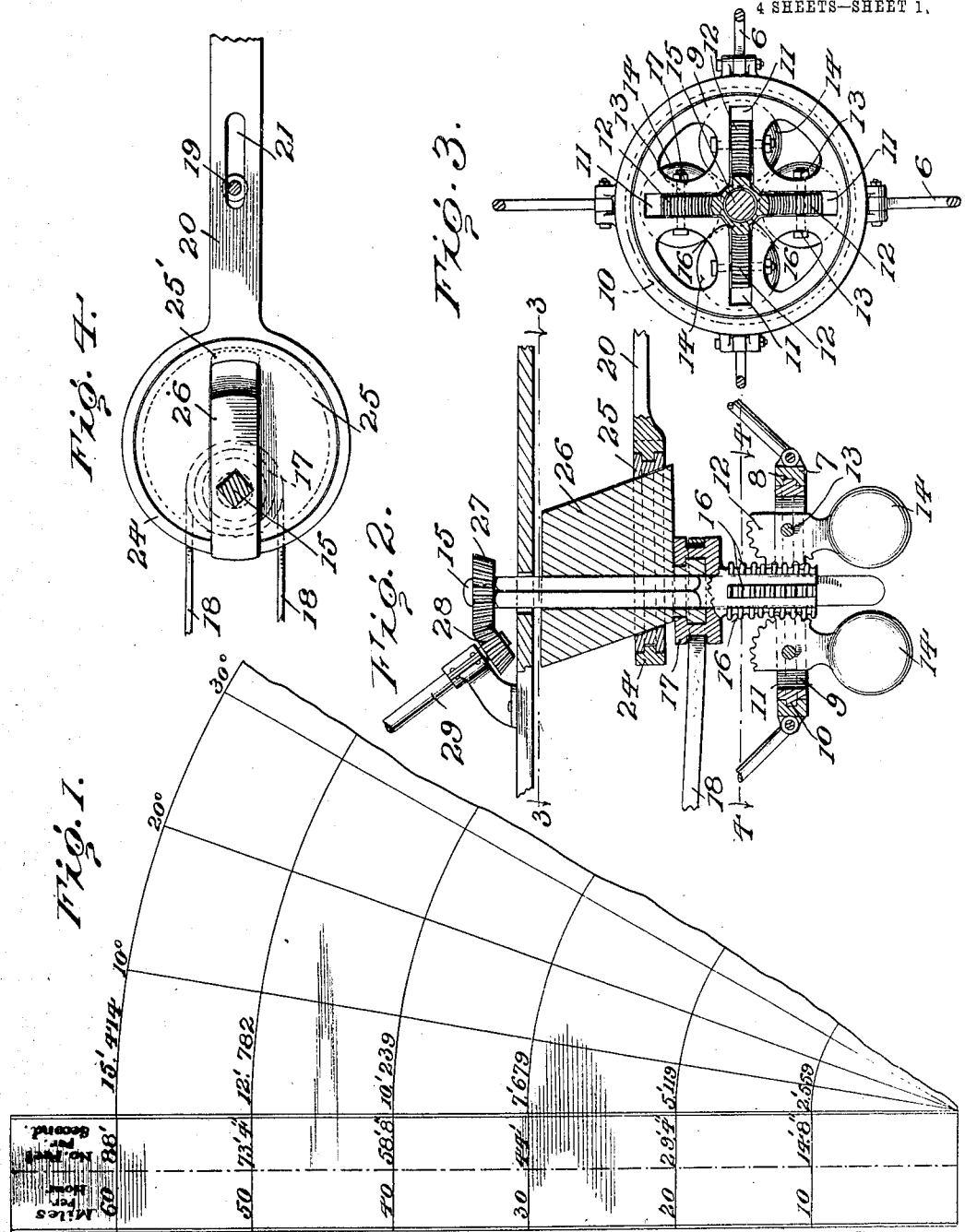

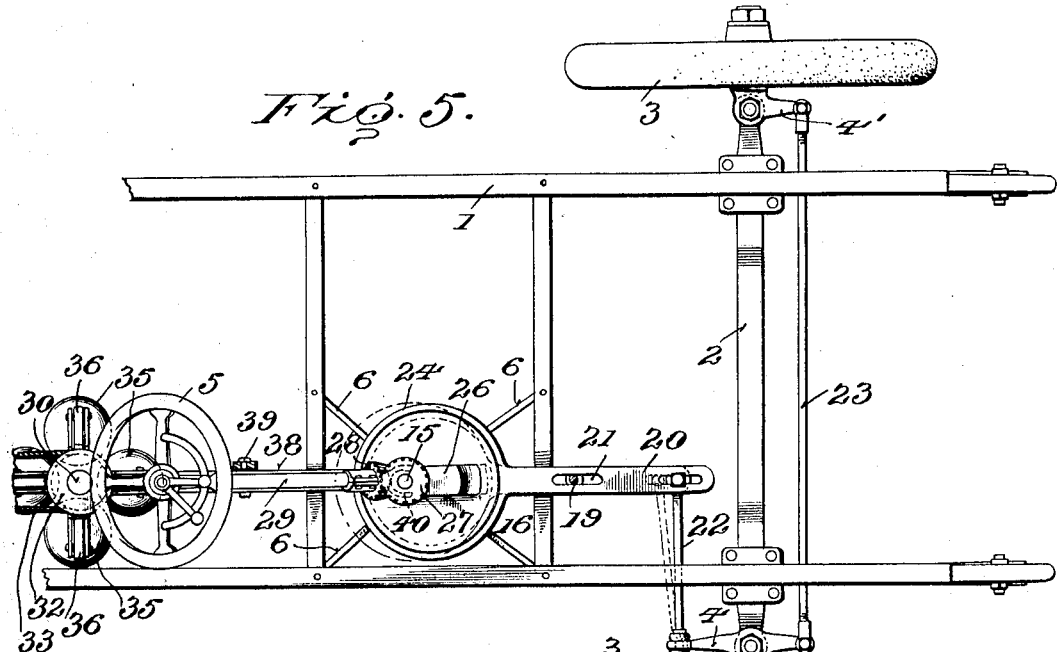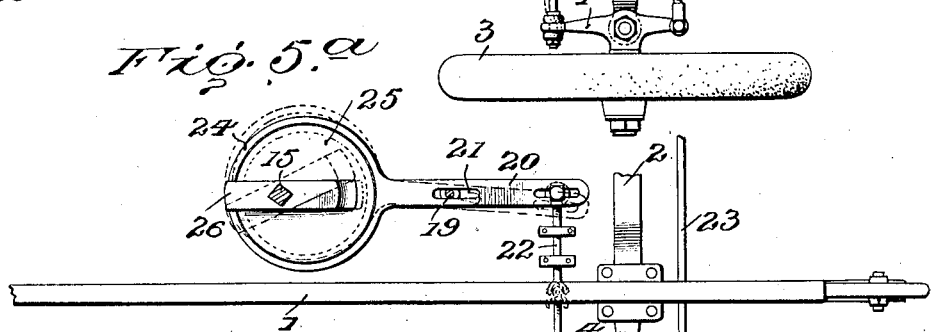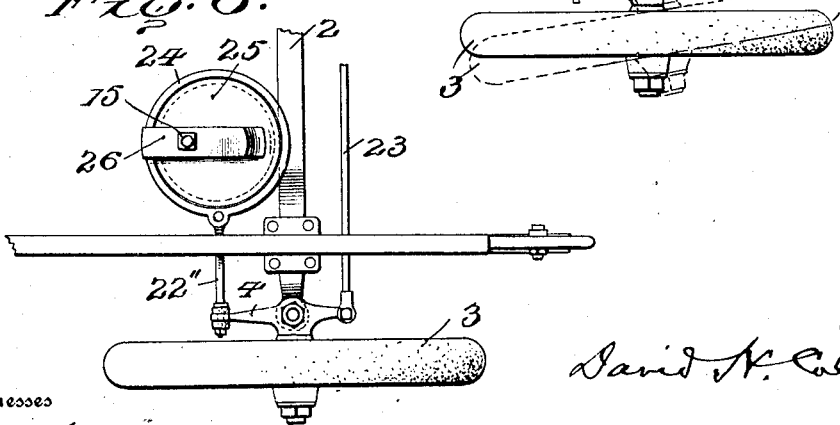

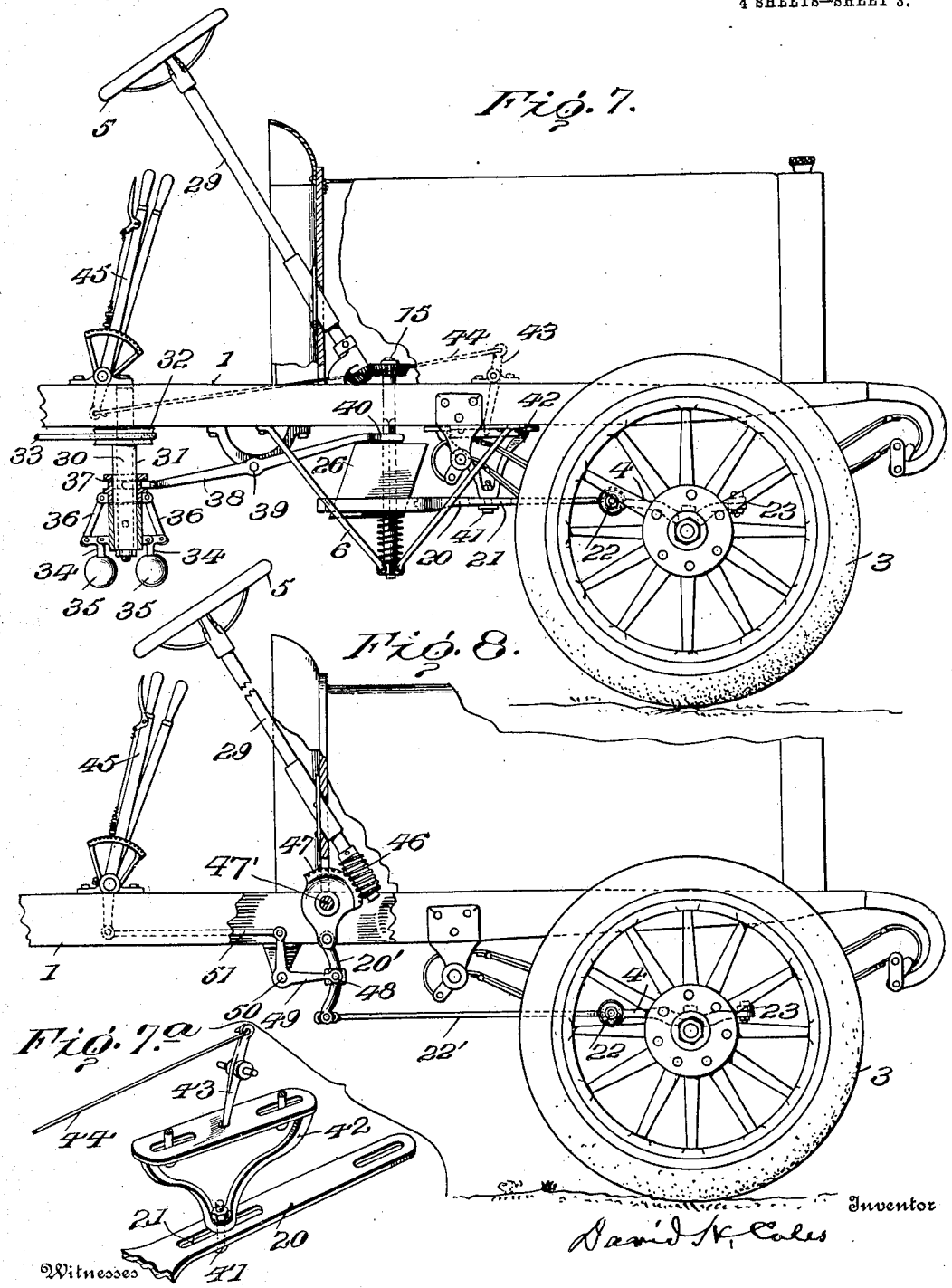

UNITED STATES PATENT OFFICE.

DAVID H. COLES, OF BROOKLYN, NEW YORK.

STEERING MECHANISM FOR SELF-PROPELLED VEHICLES.

No. 914,018.  Specification of Letters Patent.  Patented March 2, 1909.

Application filed January 21, 1908. Serial No. 411,996.

*To all whom it may concern:*

Be it known that I, DAVID H. COLES, of Brooklyn, New York, have invented a new and useful Improvement in Steering Mechanism for Self-Propelled Vehicles, which improvement is fully set forth in the following specification.

My invention relates to steering mechanism for power-propelled vehicles such as automobiles, and has for its object to provide means whereby a given movement of the steering wheel or other steering device will in a given unit of time produce approximately the same deviation from a straight line at various speeds. If an automobile be moving at the rate of ten miles an hour, and the steering mechanism as now constructed be operated so as to turn the wheels at an angle of say 10° from the line of movement, the machine in one second of time would advance between fourteen and fifteen feet, and would deviate from the straight line something over two and one-half feet; whereas, if the machine were moving at the rate of twenty miles an hour, it would in one second of time advance between twenty-nine and thirty feet, and would deviate from the original line over five feet. For thirty and forty miles an hour, the advance in a second of time would be forty-four and fifty-eight feet respectively, while the deviation from a straight line would be seven and six-tenths and ten feet respectively. It thus appears that, dependent upon the rate of speed, the deviation from a straight line varies greatly in a given unit of time. It is believed that many accidents, such as ditching of machines, running the same into obstacles at the side of the road, and the like, are due to the failure of the driver of the machine to take into account the speed at which the machine is moving, and hence the great deviation from a straight line, which would occur in a given unit of time, say one second.

The object of the present invention is to provide means whereby at various speeds a given movement of the steering wheel or other steering device will produce approximately the same deviation from a straight line in a given unit of time, to the end that excessive deviations from the line of travel may be avoided when the machine is moving at high rates of speed.

With this object in view, the invention consists in the interposition between the steering-wheel (or other means for controlling the steering mechanism) and the steering (front) wheels of the automobile of a lever so arranged that the relative lengths of the two arms of the lever may be changed or varied with the increase or decrease in the speed of movement of the vehicle, to the end that said lever shall operate to turn the wheels at a less angle when the machine is moving at a high rate of speed than when it is moving at a low rate of speed, even though the steering wheel or other corresponding control device is shifted to substantially the same extent in both cases. The means for thus altering the relative or proportionate lengths of the respective arms of the interposed lever may be either manually or automatically operated. Furthermore, the change in the relative lengths in the lever may be secured either by shifting the lever with relation to its fulcrum or shifting the fulcrum with relation to the lever, the result accomplished in either case being the same, viz., that one arm of the lever is shortened while the other arm of the lever is correspondingly lengthened.

The inventive idea involved is capable of expression in a great variety of mechanical structures, some of which, for the purpose of illustrating the invention, will be hereinafter specifically described and then pointed out in the claims, but it is to be understood that such drawings are for the purpose of illustration only, and are not designed to define or limit the scope of the invention, reference being had to the claims for that purpose.

In said drawings—Figure 1 is a diagrammatic view indicating the number of feet traveled by a vehicle per second when moving at the rate of ten, twenty, thirty, forty, fifty and sixty miles per hour, and also the number of feet of deviation from a straight line that would occur in a second of time when the steering (front) wheels are turned at an angle of 10, 20°, etc., from said straight line; Fig. 2 is a broken detail, partly in section and partly in side elevation, illustrating one means for automatically changing the relative lengths of the two arms of the controlling lever by shifting the same with relation to its fulcrum, and Figs. 3 and 4 are details illustrating a part of the same structure; Fig. 5 is a broken plan view of the forward part of the frame and steering mechanism of an automobile, showing an automatic device of the same character as that shown in Figs. 2, 3 and 4, but with a slightly different arrangement of parts; Figs. 5ª and 6 are broken plan views illustrating one element of the invention; Fig. 7 is a side elevation of Fig. 5; Fig. 7ª is a perspective detail; Fig. 8 is a side elevation of still another form of the invention, in which the relative lengths of the arms of the controlling lever are manually regulated when the levers which effect the change of speed of the automobile are operated by the driver; Fig. 9 is a diagrammatic plan illustrating still another form. In Fig. 7 there is also shown, in addition to the automatic means, means for manually varying the relative lengths of the arms of the controlling lever.

Referring to Figs. 2, 3, 4 and 5, 1 indicates the frame of an automobile, 2 the front axle thereof, and 3 the front wheels which, as usual, are connected to the axle so as to have angular adjustment with relation thereto for the purpose of steering the vehicle, said angular adjustment being secured through a lever 4, rigid with the spindle upon which the wheels turn and which is connected by suitable mechanism to the steering wheel 5. Suspended by suitable braces 6, 6, to the frame of the machine is an annular frame 7 which has on its inner periphery a groove 8. A disk 9 having a tongue 10 is mounted within the annular frame 7, with the tongue 10 engaging in the groove 8 of said frame, so that the disk turns readily within the frame. The disk 9 is provided with four radial slots 11 within which are hung segments 12 provided with suitable gear teeth, said segments being suspended on pins 13 and carrying on their lower ends weights or balls 14. On a vertical shaft 15 there is slidably mounted a sleeve having a plurality of racks 16, here shown as four, with which the toothed segments 12 are in mesh. These racks 16 are formed on a sleeve surrounding the shaft 15, which sleeve bears on its upper portion a driving pulley 17, driven by a belt 18 extending to some moving part of the vehicle. The construction thus far described is such that the revolutions of the sleeve are imparted to the disk 9 by the engagement of the racks in slots 11 therein, and as the machine is speeded up, centrifugal force will cause the balls 14, 14, to fly upward and outward, whereupon the geared segments 12 will, through the racks 16, cause the sleeve and the pulley 17 to slide downward on the shaft 15, the extent of the downward movement being dependent upon the speed with which the machine is moving.

Referring to Fig. 4, 19 is a fulcrum pin for a lever 20 having therein a slot 21 through which the fulcrum pin 19 extends. The forward end of the lever 20 (see Fig. 5) is connected through link 22 with the lever 4 rigid with the spindle upon which one of the forward wheels revolves, said lever 4 in the present instance being connected by a rod 23 with a lever 4' on the opposite side of the machine, which lever 4' is rigid with the spindle on which the wheel on that side of the machine revolves. The rear end of the lever 20 is provided with a strap or yoke 24 embracing and supporting a disk 25, said disk being, however, free to turn within the strap or yoke 24, as will be readily understood from an inspection of Fig. 2. Passing through a vertical slot in the disk 25 is a cam 26 which fits somewhat closely within the slot in the disk, but is nevertheless free to slide up and down therein. The shaft 15 has its upper portion squared or is otherwise constructed so as to be keyed to the cam 26 through which it passes, the cam, however, being free to move up and down upon said shaft, the construction being such that while the cam is thus free to move upward and downward on the shaft, it is compelled to turn with the shaft, and in thus turning with the shaft it causes the disk 25 to turn with said shaft, by reason of the engagement of the cam with the slot 25' in said disk. The cam 26 is coupled with the vertically sliding pulley 17 in any suitable way, here shown as by means of a downwardly projecting hub which is provided with outwardly projecting shoulders which are received and engaged by an inwardly projecting flange on the pulley, the arrangement of the parts being such that the pulley 17 may revolve freely upon said hub, but the upward and downward movements of the pulley and the rack carried thereby will necessarily impart corresponding upward and downward movements to the cam 26.

It will be observed that when the speed of the machine is such as to cause centrifugal force to throw the balls 14 upward and outward through the disk 25, thereby necessarily shifting the disk rearward, and with it the lever 20, so that the two arms of the lever 20 will have their relative lengths changed, the forward arm of the lever being shortened and the rearward arm being lengthened. Conversely, when the cam 26 is moved upward through the disk 25, the forward arm of the lever will be lengthened and the rear arm of the lever shortened.

On the upper end of the shaft 15 is keyed a beveled gear 27 meshing with beveled gear 28 on the lower end of the usual steering shaft 29, which is controlled by the steering-wheel 5.

The operation of this form of the device will be readily understood. When the machine is moving at a low rate of speed, the parts will occupy substantially the position shown in Figs. 2 and 5. If now the operator desires to turn the machine from the right line in which it is moving, he will turn the steering-wheel 5 in the proper direction, and thereby revolve the shaft 15, and thus turn the lever 20 upon its fulcrum 19, imparting either a push or a pull to the link 22, with the result of giving a corresponding angular turn to the wheels 3, 3. If the speed of the machine be increased say from ten to twenty miles an hour, centrifugal force will cause the balls 14 to move more or less outward, thereby drawing the cam 26 downward, and thus shifting the lever 20 on its fulcrum 19. The result of this is that if the steering-wheel be given the same angular movement that was given it say when the machine was moving ten miles an hour, the front end of the lever 20 where it pivotally engages the link 22 will have less movement imparted to it than was imparted to it by the same angu-movement of the steering-wheel when the machine was moving ten miles an hour, and the front wheels of the machine will therefore have a correspondingly less angular movement imparted to them, even though the angular movement of the steering-wheel be the same. This is due to the fact that the the proportionate lengths of the two arms of the lever 20 have been altered by shifting the lever rearward on its fulcrum. It will be readily seen that by properly adjusting the proportions of the various parts, it will thus be possible to have the machine deviate in a given unit of time, say one second, the same distance from a straight line when moving at the rate of twenty miles an hour as when moving at the rate of ten miles an hour, even though the angular adjustment of the steering-wheel be the same in both cases. The same is true if the speed of the machine be increased to thirty, forty, or more miles an hour, such increase of speed automatically shortening the front arm of the lever and correspondingly lengthening the rear arm of the lever, so that the higher the speed of the machine, the less will be the angular turn of the wheels of the vehicle for any given angular adjustment of the steering-wheel or other device corresponding to the steering-wheel.

Referring to Figs. 5 and 7, 30 indicates a shaft on which there revolves a sleeve 31, to which is connected a pulley 32 driven by a belt 33 extending to a moving part of the vehicle. On the sleeve 31 there are pivoted a plurality of bell crank levers 34 on the vertical arms of which are balls 35, while the horizontal arms are connected by links 36 with a collar 37 provided with an annular groove engaged by the forked end of a lever 38, fulcrumed at 39 and having its forward end 40 bearing on the top of the cam 26, which slides up and down on the shaft 15, through a disk 25 as in Fig. 2 on the rearward end of the lever 20 fulcrumed at 41, and which fulcrum is carried by a frame 42 capable of being adjusted forward or rearward through the action of a lever 43, connected by a link 44, with the usual change speed levers 45. It will be observed that in this structure the fulcrum 41 of the lever 20 may be adjusted forward and backward by the shifting of the change speed levers 45, and also that a still further adjustment of the lever 20 on its fulcrum will be brought about by the action of centrifugal force on the balls 35 through the lever 38, whereby cam 26 will be more or less depressed and the lever 20 correspondingly shifted on its fulcrum. It is thus apparent that the result achieved may be accomplished either by the shifting of the lever forward and backward with relation to its fulcrum or by shifting the fulcrum forward and backward with relation to its lever, or by shifting both the fulcrum and the lever, and my invention is designed to embrace, and does embrace, either or both of these actions, the sole essential being that the lengths of the two arms of the lever 20 shall be varied either automatically or manually or automatically and manually for the various changes in speed. In the automatic device the variations would be in proportion to each fractional variation in speed; whereas in the manually operated device, the variations would be such as would occur for changes of speed from high to low speed and the like.

In Fig. 8 is shown another form for manually changing the proportionate lengths of the two arms of the controlling lever. In Fig. 8, the steering shaft 29 has on its lower end a worm 46 engaging a worm rack 47 mounted to rock on a pin 47'. This rocking member engages through a pivotal connection the upper end of the controlling lever 20' fulcrumed at 48 on one arm of a bell-crank-lever 49 turning on a pivot 50, and having the other arm connected by a link 51 to the lower end of the change speed lever 45. It will be apparent that the shifting of the change speed lever 45 will elevate or depress the fulcrum 48 of the lever 20', dependent upon the direction of movement of the lever 45. The lower end of the lever 20' is connected by the link 22' to the steering arm connected directly to the wheel-spindle. It will be apparent that any given angular turn of the steering-wheel 5 will impart a greater or less movement to the link 22', depending upon the position of the fulcrum 48 of the lever 20'. And the position of this fulcrum is determined by the position of the change-speed lever 45.

The operation of the construction shown in Fig. 8 will be readily understood, the shifting of the change-speed lever 45 producing a corresponding shifting of the fulcrum 48, and thus producing a corresponding change in the relative lengths of the controller levers 20', as the case may be.

Referring to Fig. 5, it will be seen that there is here shown simply the lever 20 turning on its fulcrum 19 directly connected by the link 22 with the lever 4, rigidly connected to the spindle upon which the front wheel turns. Fulcrum 19 of the lever 20 passes through the slot 21, and fulcrum 19 may be adjusted in said slot in any suitable way, as, for example, by connection to the change-speed lever 45, as in Fig. 7.

In Fig. 6 there is shown the cam 26 passing through the disk 25, embraced by the collar 24, as in the previous figures, said collar, however, being directly connected to a link 22" leading directly to the lever 4. In this form of the device the controlling lever, the length of whose arms can be relatively changed by the shifting of the lever or its fulcrum, is omitted, and the steering is effected directly through the medium of the shaft 15 controlled by the steering wheel in the usual manner, the required push or pull upon the link 22" being accomplished by the eccentric relation of the shaft 15 to the disk 25, which disk is revolved by the engagement of the cam 26 with said disk.

Referring to Fig. 9, there is here diagrammatically illustrated the effect of shifting the fulcrum with relation to the lever or the lever with relation to the fulcrum. It will be apparent that when the fulcrum is in the central position $a$, and the steering-wheel is operated to bring the point $d$ on the lever up to and opposite the steering-wheel shaft 29, the wheel 3 will take the angular position indicated by dotted lines $a'$. If now the fulcrum be shifted to the position $b$, the same operation of the steering-wheel to bring the point $d$ opposite the steering shaft 29 will shift the front wheel to the angular position indicated by dotted lines $c'$; and on the other hand, if the fulcrum be shifted to position $c$, and the same movement be given to the steering-wheel so as to bring the point $d$ opposite to the shaft 29, the wheel 3 will take the angular position indicated by dotted lines $b'$. This diagram very aptly illustrates how by means of my invention it is possible by the same angular movement of the steering-wheel to place the front wheels of the vehicle at different angles of inclination to the right line at which the machine is traveling, to the end that for different speeds the variation from a straight line may be approximately the same number of feet per unit of time.

Now as the drivers of machines become accustomed to imparting a given movement to the steering-wheel in order to produce a given deviation, as when passing another vehicle on the roadway and traveling at ordinary rates of speed, they are liable to give the wheel the same turn when traveling at a much higher rate of speed, and this would produce a much greater deviation (in a given unit of time) from the line in which the vehicle was traveling than would be the case if it was moving at a low rate of speed. If the road was narrow, or obstructions such as a telegraph pole or a tree stood at the side of the road, or a ditch, the result would be that the machine would be driven against such obstructions or into the ditch before the reverse movement could be given to the wheel. By my invention this difficulty is obviated, since, without regard to the rate of speed at which the vehicle may be traveling, the same annular turn to the steering-wheel may cause the machine to turn out the same distance in a given unit of time.

While I have herein accentuated the change in the relative lengths of the arms of the controlling lever as the principal and most important feature of my invention, there are, nevertheless details of construction herein which form a part of the invention, and which may be utilized either with or without said controlling lever, as, for example, that construction shown in Fig. 6, and I desire it to be expressly understood that I claim the same as a part of my invention, whether used with or without such controlling lever.

While reference has herein been made to the steering-wheel as the manually operated device by means of which the driver controls the steering, it is to be understood that such steering-wheel is merely an example of one of several manually operated devices which might be, and sometimes are, employed, and when the term "steering-wheel" is used, either in the specification or in the claims, it is meant to include any other form of steering device or steering lever capable of effecting the steering operation.

It will be apparent to those skilled in the art that various changes and proportions in the relative arrangements of the parts may be made without departing from the spirit of my invention, and all such changes are designed and intended to be included in my claims.

What I claim is:—

1. In steering mechanism for self-propelled vehicles having wheels which are turned to effect the steering thereof, the combination with such wheels, of a manually operable power device, means transmitting power from said device to said wheels to effect the steering movement, and means varying the action of said transmitting means according to speed variations of the vehicle.

2. In steering mechanism for self-propelled vehicles having wheels which are turned to effect the steering thereof, the combination with such wheels, of a manually operable power device, lever mechanism transmitting power from said device to said wheels to effect the steering movement, and means varying the leverage of said mechanism according to speed variations of the vehicle.

3. In steering mechanism for self-propelled vehicles having wheels which are turned to effect the steering thereof, the combination with such wheels, of a manually operable power device, lever mechanism transmitting power from said device to said wheels to effect the steering movements, and automatic means and manually operable means each varying the leverage of said mechanism according to the speed variations of the vehicle.

4. In steering mechanism for self-propelled vehicles having wheels which are turned to effect the steering thereof, the combination with such wheels, of a manually operable power device, lever mechanism transmitting power from said device to said wheels to effect the steering movements, and automatic means varying the leverage of said mechanism according to the speed variations of the vehicle.

5. In steering mechanism for self-propelled vehicles having wheels which are turned to effect the steering thereof, the combination with such wheels, of a manually operable power device, lever mechanism transmitting power from said device to said wheels to effect the steering movements, and manually operable means varying the leverage of said mechanism according to the speed variations of the vehicle.

6. In an automobile, the combination of a steering-wheel, means (including a lever) operably connecting said steering-wheel with the front wheels of the machine, manually operable means for shifting the fulcrum of said lever, and automatic means shifting said lever with relation to its fulcrum, whereby the leverage between the steering-wheel and the vehicle wheels may be varied at various speeds of the automobile.

7. In an automobile, the combination of a steering-wheel, means (including a lever) operably connecting said steering-wheel with the front wheels of the machine, and manually operable means for shifting the fulcrum of said lever, whereby the leverage between the steering-wheel and the vehicle wheels may be varied to suit various speeds of the automobile.

8. In an automobile, the combination of a steering-wheel, means (including a lever) operably connecting said steering-wheel with the front wheels of the machine, and automatic means driven from a moving part of the machine and operating to shift said lever with relation to its fulcrum.

9. In an automobile, the combination of a steering-wheel, means (including a lever) operably connecting said steering-wheel with the front wheels of the machine, a centrifugal device driven from a moving part of the machine, and means operated by said centrifugal device and operating to shift said lever with relation to its fulcrum.

10. In an automobile, the combination of a steering-wheel, means (including a lever) operably connecting said steering-wheel with the front wheels of the machine, and manually-operable means for shifting the fulcrum of said lever with relation to the lever.

11. In an automobile, the combination of a steering-wheel, means (including a lever) operably connecting said steering-wheel with the front wheels of the machine, a speed-controlling lever, and connections between said speed-controlling lever and the fulcrum of the first-mentioned lever whereby the said fulcrum is shifted relatively to its lever when the speed-controlling lever is operated.

12. In an automobile, the combination of a steering-wheel, a shaft operably connected to said wheel, a cam through which said shaft passes and to which it is keyed, a disk engaging said cam and eccentric to said shaft, a lever having a part embracing said disk, and connections between said lever and the front wheels of the vehicle.

13. In an automobile, the combination of a steering-wheel, a cam, a disk, a collar embracing said disk engaging said cam and within which the latter is free to turn, connections between the front wheels of the vehicle and said collar, and a shaft connected to said steering-wheel and keyed to said cam and eccentric to said disk so that the latter turns therewith.

14. In an automobile, the combination of a steering-gear, means (including a lever) connecting said steering-wheel with the front wheels of the machine, a cam operably connected to said lever to shift it on its fulcrum, and means governed by the speed of the machine and operating said cam.

In testimony whereof I have signed this specification in the presence of two subscribing witnesses.

DAVID H. COLES.

Witnesses:
RALPH L. SCOTT,
WILLARD H. HARTING.